United States Patent [19]

Hehl

[11] 4,080,144
[45] Mar. 21, 1978

[54] TIE ROD STRUCTURE FOR DIE CLOSING UNIT OF INJECTION MOLDING MACHINE

[76] Inventor: Karl Hehl, Arthur-Hehl-Strasse 32, 7291 Lossburg, Germany

[21] Appl. No.: 729,034

[22] Filed: Oct. 4, 1976

[30] Foreign Application Priority Data

Oct. 4, 1975  Germany .............................. 2544537
Oct. 24, 1975 Germany .............................. 2547633

[51] Int. Cl.² .................... B29F 1/06; B22D 17/20; B22D 17/26
[52] U.S. Cl. .............................. 425/450.1; 425/589; 425/595; 425/451.2; 425/451.9; 425/DIG. 221
[58] Field of Search ............... 425/DIG. 223, 451.2, 425/450.1, 242 R

[56] References Cited

U.S. PATENT DOCUMENTS

| | | | |
|---|---|---|---|
| 2,976,569 | 3/1961 | Quere et al. | 425/451.2 |
| 3,729,283 | 4/1973 | Eggenberger et al. | 425/451.2 |
| 3,890,081 | 6/1975 | Grundmann | 425/450.1 |
| 3,910,736 | 10/1975 | Starchelin et al. | 425/451.2 X |
| 3,976,416 | 8/1976 | Hehl | 425/451.2 X |

FOREIGN PATENT DOCUMENTS 1,245,853  9/1971  United Kingdom .............. 425/451.2

*Primary Examiner*—J. Howard Flint, Jr.
*Attorney, Agent, or Firm*—Joseph A. Geiger

[57] ABSTRACT

A tie rod structure for a die closing unit of an injection molding machine in which several parallel tie rods hold together a stationary die carrier plate and a stationary head plate, for example, and where the tie rods are seated in attachment bores of the connected plates whose diameter is the same as that of the tie rod guide portion, a threaded tie rod portion on the outside of the plate carrying a threaded abutment collar which is clamped against the plate by a clamping member engaging the extremity of the tie rod. The clamping member may be rotatable out of the way of the tie rod, in order to permit retraction of the latter.

7 Claims, 14 Drawing Figures

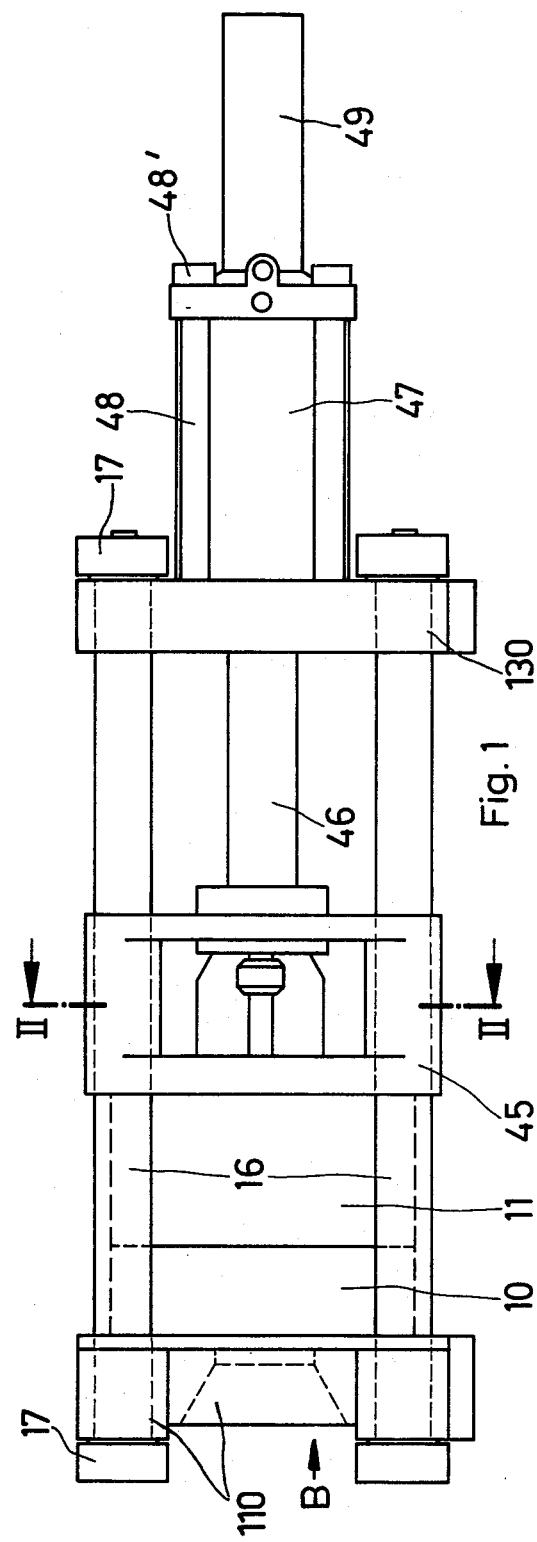
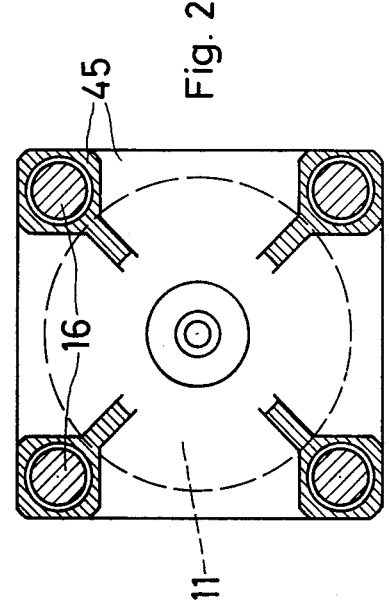

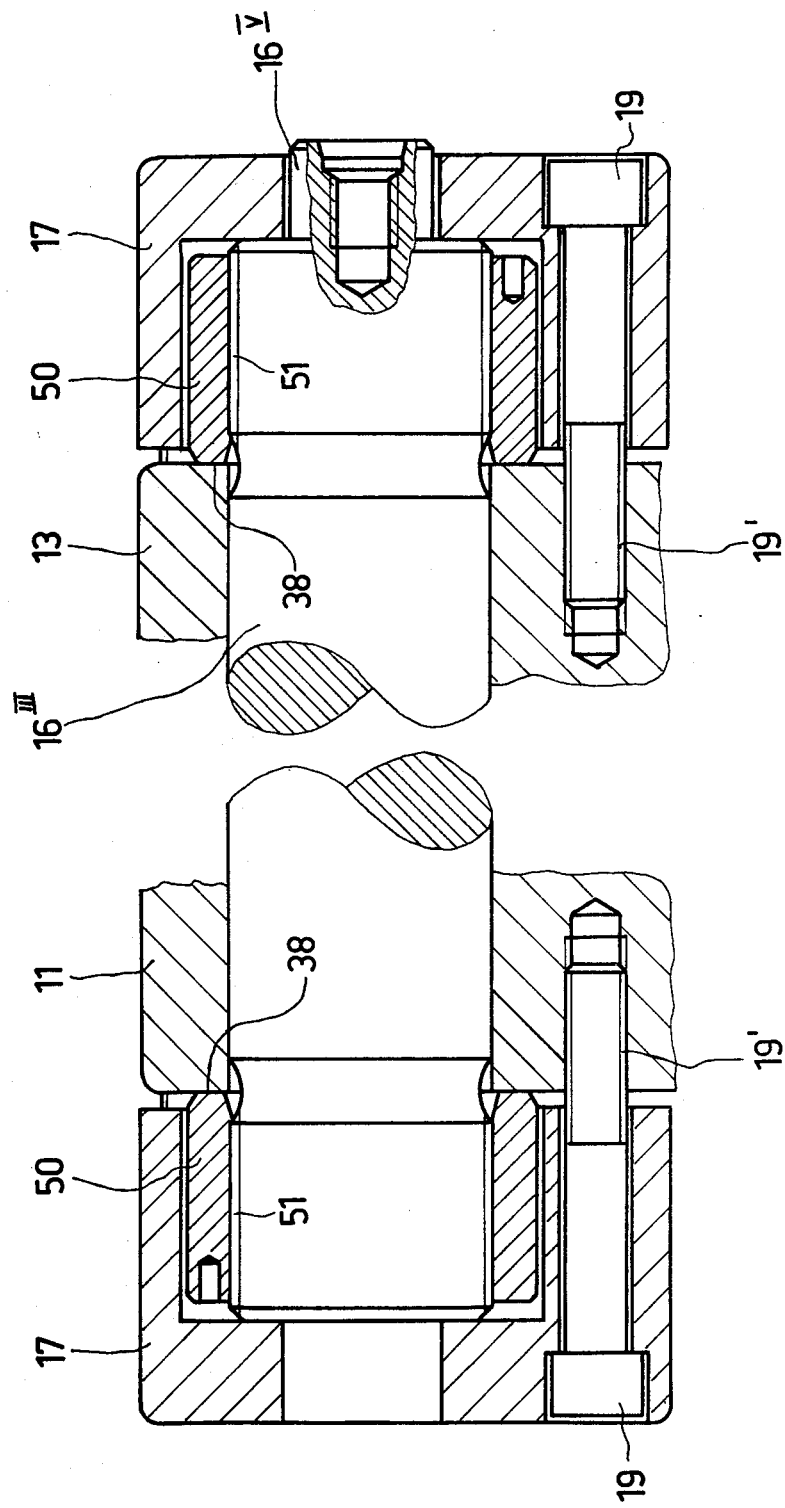

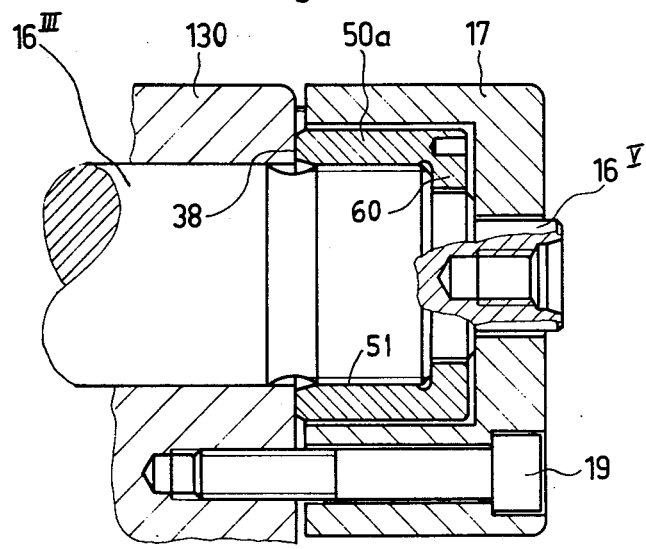
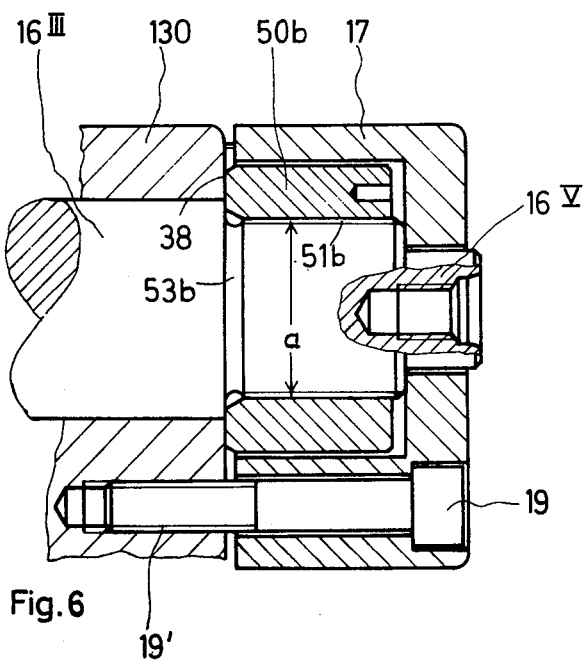

TIE ROD STRUCTURE FOR DIE CLOSING UNIT OF INJECTION MOLDING MACHINE

BACKGROUND OF THE INVENTION

1. Field of the Invention

The present invention relates to injection molding machines and, more particularly, to hydraulically actuated die closing units of injection molding machines in which the movable parts of the die closing unit are supported and guided by means of two or more parallel tie rods.

2. Description of the Prior Art

Although there exist several different types of die closing units, when classified in accordance with the mode in which the die closing movement is generated and in accordance with the means by which the injection molding dies are clamped together during injection, virtually all of them employ tie rods, in most cases two or four parallel tie rods, along which the movable parts of the die closing unit are guided relative to the stationary parts, and which also serve to apply the clamping force to the die plates or to hold the stationary die plate against the clamping force which is applied through the movable die plate.

Accordingly, the tie rods of a die closing unit are subjected to cyclically occurring elevated tension stress. On the other hand, the tie rods need to be manufactured and mounted with extreme precision, in order to assure the required precision of die plate guidance and to provide the precise parallel alignment of the die mounting plates which is necessary for the production of injection molded parts of high quality.

While it has heretofore been the common practice to connect the tie rods to the stationary and/or movable die plates of the die closing unit by providing on at least one extremity of the tie rods an externally threaded end portion of reduced diameter, with ring shoulders on the tie rods positioning the plate in question, I have previously suggested a tie rod connection in which the need for such a reduced diameter tie rod end portion is eliminated, and where the diameter of the tie rod attachment bores in the plate, or plates, is the same as the diameter of the guide portion of the tie rods. Such a tie rod connection is disclosed in my copending application, Ser. No. 689,813, filed May 25, 1976, now U.S. Pat. No. 4,021,181.

This earlier application suggests a tie rod connection in which the tie rod reaches through the attachment bore with a tight fit and has a shallow annular abutment groove in a tie rod portion which protrudes beyond the plate or thrust member, so that the groove is located on the outer side of the plate, a split abutment ring being seated in the annular groove in such a away that one axial end face of the abutment ring bears against the outer side of the thrust member, while the other axial end face of the ring bears against a flank of the abutment groove. This abutment configuration is preloaded in the axial direction by means of a clamping cap which encloses the tie rod extremity so as to radially retain the split abutment ring in its groove, while applying an axially inwardly directed preload to the tie rod itself, under the action of clamping bolts which pull the clamping cap towards the thrust member.

The advantages which flow from this earlier solution relate to the elimination of the stress concentration which is unavoidably associated with the ring shoulder at the transition between the reduced diameter tie rod end portion and its full diameter. It is a well-known fact that, due to the stress concentration which is associated with such a ring shoulder, a tie rod of stepped diameter configuration is considerably less resistant than a tie rod whose diameter is equal to the diameter of the smaller end portion, but which is continuous and without a shoulder.

An additional important advantage of my earlier solution relates to the fact that a tie rod with a clamping shoulder and counter-acting clamping nut on the opposite side of the thrust member needs to have a preload applied to the clamping nut which is higher than the peak cyclical tension stress on the tie rod, in order to preclude the possibility that the clamping shoulder temporarily disengages itself from the thrust member. The arrangement of an abutment groove and split abutment ring on the outside of the thrust member eliminates this need, although a lesser preload is still necessary.

This earlier solution also enhances the structural rigidity and dimensional accuracy of the frame which is formed by the tie rods and the attached plate, or plates. Another important advantage flows from the fact that this tie rod connection allows for the tie rods to be retracted through their attachment bores in both axial directions, following removal of the clamping cap and of the split abutment ring from at least one tie rod extremity.

A complete die closing unit taking advantage of this tie rod connection is disclosed in my copending application, Ser. No. 640,531, filed Dec. 15, 1975, now U.S. Pat. No. 4,025,264. There, it can be seen that the improved tie rod connection makes it possible to much more efficiently utilize the die mounting space which is available between the four tie rods of a die closing unit, if at least one of the tie rods is retractable for the mounting of the injection molding die on the die carrying plates. The retractability of the tie rods offer the further advantage that the tie rods themselves can be used as centering members for the die halves.

In spite of these important advantages, the earlier solution has certain inherent limitations. One of these limitations relates to the fact that the abutment groove in the tie rod, although shallow, represents itself a stepped diameter configuration, where the tie rod has a weakened cross section. Associated with it is a certain degree of stress concentration, although considerbly less pronounced than that of the prior art ring shoulder which engages the thrust member from the opposite side of the clamping nut.

Another limitation which is inherent in my earlier solution relates to the fact that the outer flanks of the abutment grooves have to be located with extreme precision in the axial sense, since it is these flanks, in conjunction with the axial width of the split abutment rings, which determine the position of the thrust member to which the tie rods are attached. Even precisely identically machined the tie rods may present a problem in this regard: tie rods of initially identical length may undergo different degrees of elongation during heat treatment, dependng upon the specific alloy composition of the steel used, which itself may vary within certain alloy composition tolerances. It thus may become necessary to separately regrind the width of the split abutment rings, in order to compensate for axial alignment deviations between the abutment groove flanks of the several tie rods. If left without compensation, these alignment deviations will reflect themselves in corresponding alignment deviations of the attached thrust member or plate, leading to corresponding alignment errors between the die halves on the die carrier plates, and at the same time imposing bending moments on the tie rods which may create friction inducing tie rod distortions.

SUMMARY OF THE INVENTION

It is a primary objective of the present invention to further improve upon the above-described earlier suggestion by eliminating or reducing the limitations mentioned, while maintaining its advantages, with the result that the tensile fatigue strength of the tie rods is further increased and that an axial adjustablity of the tie rod attachment is available, where necessary. Another objective of the present invention is an improvement relating to the retractability of the tie rods by further simplifying the operative steps which are required for tie rod retraction.

The present invention proposes to attain these objectives by suggesting an improved tie rod connection for the die closing unit of an injection molding machine in which the full diameter of the tie rod reaches through and is seated in a matching attachment bore of the connected plate or thrust member, and where the axial abutment for the transmittal of the die closing pressure is obtained by means of an internally threaded abutment collar which is seated on an externally threaded tie rod end portion on the outer side of the connected thrust member the tie rod being axially clamped against the latter by means of a clamping member engaging the extremity of the tie rod, so as to preload the abutment collar against the outer side of the connected plate. The clamping member may be a hollow clamping cap, a clamping flange, or a clamping bracket.

In the proposed solution the shallow abutment groove of the prior solution is in effect replaced with the spiral groove of an externally threaded tie rod portion, the place of the split abutment ring being taken by the cooperating internally threaded abutment collar. The threaded connection has the advantage of providing the necessary axial abutment pressure area on a greatly reduced radial depth, meaning that the remaining core diameter of the tie rod can be larger than the bottom diameter of the shallow groove of the previously suggested tie rod connection.

The threaded connection has the additional advantage of offering a convenient axial adjustablity of the tie rod connection, for a precise alignment of the tie rods. This feature is especially important in the case of die closing units which have four tie rods. The axial adjustability eliminates the previous encountered alignment problem which necessitated a high degree of precision in the machining of the outer flanks of the abutment grooves. The replacement of the split abutment ring with a full abutment collar also eliminates certain difficulties and necessary precautions which relate to the insertion and removal of the precision-machined ring halves. At the same time, manufacturing operations are simplified.

While the clamping cap of the earlier solution is also a part of the present solution, being used in the same manner as previously suggested, it no longer needs to fulfill the secondary function of radially retaining the split abutment ring in its groove. In a preferred embodiment, therefore, the present invention suggests the replacement of the clamping cap with a simple clamping flange, or with an even simpler clamping bracket, whose sole purpose is to apply an axial clamping force to the protruding extremity of the tie rod.

The advantage of such a clamping flange or clamping bracket over a hollow clamping cap in connection with the retractability of a tie rod is obvious: While a clamping cap has to have at least two clamping bolts, preferably three or four, which must all be completely unscrewed, in order to remove the clamping cap, a clamping flange or clamping bracket may have only one or two clamping bolts which can be so arranged that they need to be loosened only, whereupon the flange or bracket can be swivelled aside for the retraction of the tie rod.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 1 shows a die closing unit of an injection molding machine with four tie rods having tie rod connections in accordance with the present invention;

FIG. 2 is a transverse cross-section along line II—II of FIG. 1, showing the spatial arrangement of the tie rods;

FIGS. 3 and 4 show, at an enlarged scale, the two attached end portions of a tie rod, using the tie rod connection of the present invention;

FIG. 5 shows a modified embodiment of the invention, in a configuration similar to that of FIG. 3;

FIG. 6 shows another modified embodiment of the invention;

DESCRIPTION OF THE PREFERRED EMBODIMENTS

Figure 7:
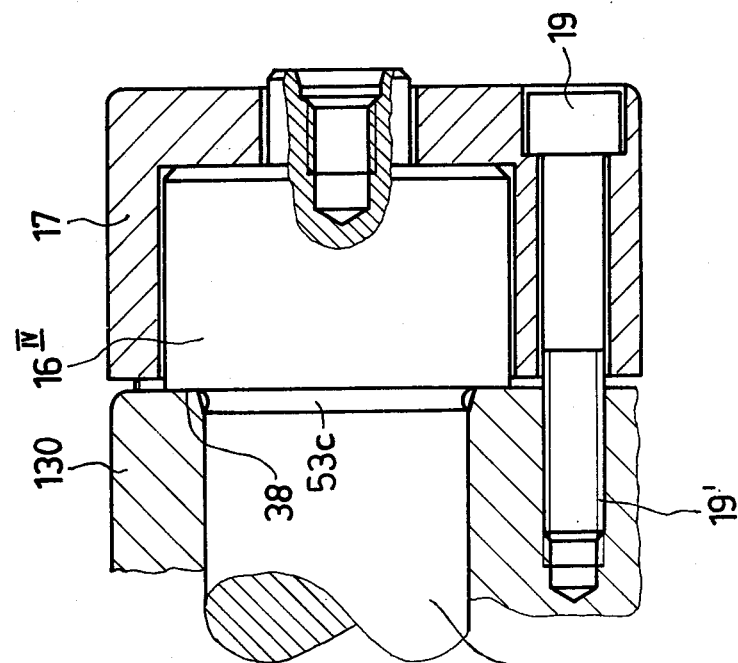
FIGS. 7 and 8 show the two end portions of a unilaterally retractable tie rod, using another modified embodiment of the invention.
Figure 8:
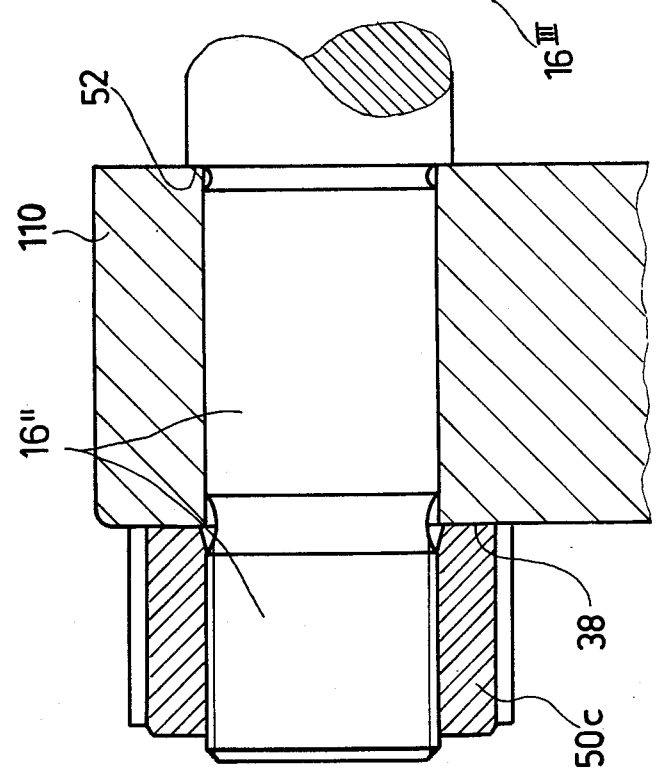

In FIGS. 1 and 2 is shown a die closing unit of the type which features a central, axially oriented hydraulic cylinder which closes the injection molding die in a pushing action. Such a push-type die closing unit is normally equipped with four parallel tie rods 16 (FIG. 2) which form a rigid frame with a stationary die carrier plate 110 and a likewise stationary head plate 130. To the latter is attached the hydraulic actuating unit, which consists of a main pressure cylinder 47 and a tandem-mounted auxiliary cylinder 49. The two cylinders are rigidly connected to the heat plate 130 by means of four cylinder tie rods 48 and tie rod nuts 48'.

The forwardly extending piston rod 46 of the main pressure cylinder 47 is connected to a movable die carrier frame 45 which engages the four tie rods 16 by means of suitable guide sockets. The injection molding die, consisting of a stationary die half 10 and a movable die half 11, is mounted between the die carrier plate 110 and the movable die carrier frame 45, the die halves 10 and 11 being attached to the plate 110 and frame 45, respectively.

The attachment configuration of one of the four tie rods 16 is shown at an enlarged scale in FIGS. 3 and 4 of the drawing, FIG. 3 showing the tie rod connection with the stationary head plate 130, and FIG. 4 showing a similar connection with the stationary die carrier plate 110. As these two figures indicate, the two stationary plates have aligned attachment bores engaged by the tie rod 16, the diameter of the bores being the same as the maximum diameter of the tie rod, which is also the guide diameter for the sockets of the movable die carrier frame 45.

Both tie rod end portions protrude a predetermined distance beyond their respective plates, the protruding tie rod portions carrying external threads 51, and each of the latter carrying an internally threaded abutment collar 50. The two external threads 51, whose outer diameter is likewise identical to the maximum diameter of the tie rod, terminate in shallow stress relief grooves 53 of a diameter which is slightly smaller than the core diameter of the two external threads 51. The stress relief grooves 53 have a groove profile formed by a large radius, thereby avoiding the stress concentration effect which is typical of grooves which have radially oriented groove flanks and/or a sharply angled profile outline.

Enclosing both protruding tie rod end portions and the clamping collars which are threaded onto them are two hollow clamping caps 17, each clamping cap having a inwardly facing clamping face engaging an end face of the tie rod 16, without touching the clamping collar 50 or the attached plate. Several clamping bolts 19 - four in the example shown - pull the clamping cap against the associated plate, thereby positioning the latter against an inwardly facing positioning shoulder 38 of the abutment collar 50, while preloading the threaded connection.

The fact that the two abutment collars 50 engage the tie rod end portions by means of a threaded connection signifies that the positioning shoulders 38 of the abutment collars are readily adjustable axially, for a precise determination of the axial distance between them. Exactly identical adjustments of this distance on all four tie rods 16 produce an exactly parallel alignment between the stationary die carrier plate 110 and the stationary head plate 130. Such a parallel alignment of the two plates not only assures the necessary parallelism between the two die halves 10 and 11, it also guarantees that the tie rods 16 themselves are free of bending forces which would result from a rigid attachment to two plates which are not in parallel alignment with one another.

The tie rod extremity shown in FIG. 3 differs from that shown in FIG. 4, inasmuch as the tie rod end portion $16'''$ has an outwardly protruding central extension $16^V$. Inside the extension $16^V$ is arranged a threaded bore into which may be screwed an appropriately threaded traction rod which serves to retract the tie rod 16 from the die closing unit, following the removal of both clamping caps 17 and the unscrewing of the abutment collar 50 from the opposite tie rod extremity. The clamping cap 17 has an appropriate central bore, in order to provide space for the central tie rod extension $16^V$. In the example of a die closing unit shown in FIGS. 1 and 2, the tie rods 16 are preferably so arranged that they are retractable in the direction towards the hydraulic drive unit, i.e. to the right-hand side in the drawing.

FIG. 5 shows a modification of the tie rod connection of FIG. 3 in which the tie rod end portion $16'''$ has an externally threaded portion 51 which is shorter than the axial length of the abutment collar 50a, the latter having a radially inwardly extending positioning flange 60, limiting the distance over which the collar 50a can be threaded onto the tie rod. The positioning flange 60, when engaging a cooperating radial flank of the tie rod end portion $16'''$, determines a fixed, easily reproducible axial location of the positioning shoulder 38 of the abutment collar 50. This modification has the advantage that, when used on a tie rod whose opposite end portion corresponds to that shown in FIG. 4, requires readjustment of only one clamping collar 50, following reinsertion of the tie rod after retraction. Since the tie rod is retracted in the direction towards the modified abutment collar 50, the latter can remain in place on the tie rod end portion $16'''$. This means that, while the abutment collar 50 on the opposite tie rod end portion needs to be unscrewed from the tie rod, it suffices to apply appropriate angular alignment markings to adjacent surfaces of the abutment collar 50 and of the tie rod, for a quick and reliable reestablishment of the original adjustment, following reinsertion of the tie rod.

In FIG. 6 is shown another modification of the right-hand tie rod connection, the purpose of which is again to obtain a predetermined axial location of the positioning shoulder 38 of the abutment collar 50b in relation to the tie rod end portion $16'''$. In this case, the desired result is achieved by offsetting the external thread 51b of the tie rod to a smaller diameter so that the positioning shoulder 38 of the abutment collar 50b is stopped against an outwardly facing radial shoulder of the tie rod end portion $16'''$. A stress relief groove 53b is arranged adjacent to the radial shoulder of the tie rod end portion. The modified tie rod connections of FIG. 5 and FIG. 6 also include, in each case, a central extension $16^V$ with a threaded bore for the insertion of a traction rod.

Inasmuch as the modified abutment collars 50a and 50b of FIG. 5 and FIG. 6 remain fixedly threaded on the tie rod end portion $16'''$, and inasmuch as there is no need to remove these abutment collars from the tie rod for the retraction of the latter, the effect of these abutment collars is the same as that of an integral enlarged head portion on the extremity of the tie rod. Such an enlarged head portion $16^{IV}$ is shown in FIG. 7. There, the tie rod end portion $16'''$ itself forms the positioning shoulder 38 as an inwardly facing radial flank of the enlarged head portion $16^{IV}$. Both the clamping cap 17 and the central extension $16^V$ are unchanged from the previous embodiments. The opposite tie rod end portion $16''$ shows a modification in which the axial adjustablity of the threaded abutment collar 50c has been eliminated through the use of a reduced diameter seating bore in the die carrier plate 110 and a stepped tie rod diameter of the type which is known from the prior art.

Figure 9:
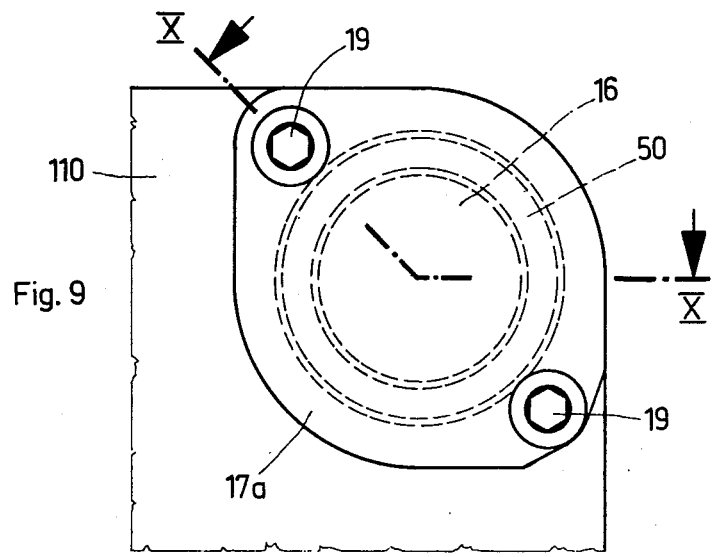
FIG. 9 is an end view of still another embodiment of the invention, featuring a tie rod connection with a clamping flange.
Figure 10:
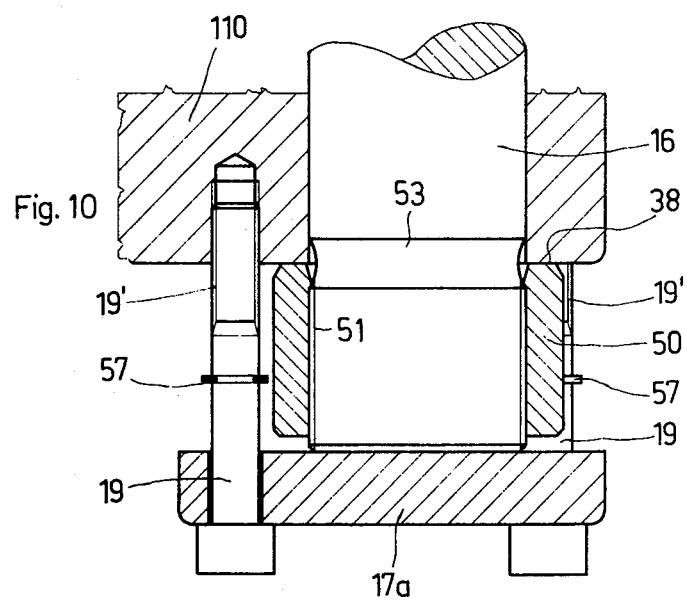
FIG. 10 shows the tie rod connection of FIG. 9 in a cross section along line X—X thereof.

FIGS. 9 and 10 illustrate a modified clamping mode for the novel tie rod connection of the invention, the previously described clamping cap 17 having been replaced with a generally flat clamping flange 17a. This flange is clamped against the extremity of the tie rod 16 by means of two clamping bolts 19 which are arranged diametrically opposite one another. This modification simplifies the precise adjustment of the axial position of the abutment collar 50, as it is no longer necessary to completely remove the clamping member, in order to obtain access to the abutment collar 50. The serviceman only needs to loosen one or both clamping bolts 19 after which the abutment collar 50 can be rotated for a position adjustment. On the other hand, when the tie rod is to be retracted in the direction towards the clamping flange 17a, the latter need not be removed completely, but it suffices that one of the two clamping bolts 19 be unscrewed, so as to allow for the clamping flange 17a to be rotated around the other clamping bolt 19, into a position in which it is out of the way of the tie rod 16 and its abutment collar 50. The unscrewed clamping bolt 50 is prevented from falling out of the clamping flange 17a by a retaining clip 57 which is seated in a groove on its shaft.

Figure 11:
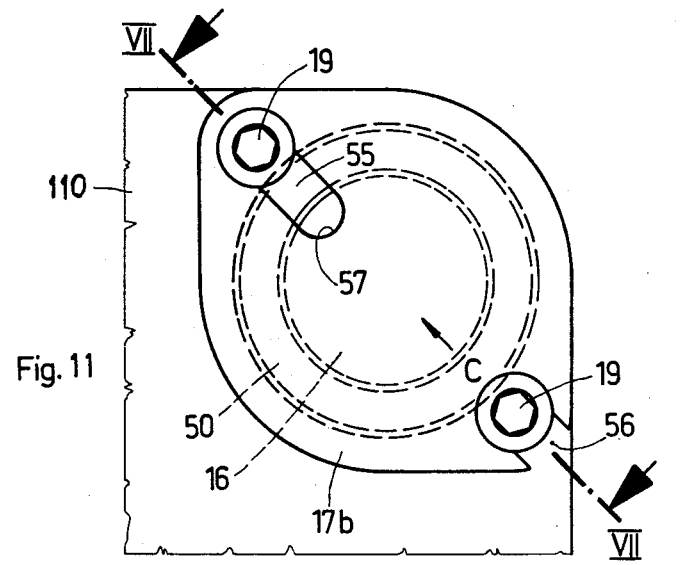
FIG. 11 shows a modification of the tie rod connection of FIG. 9.
Figure 12:
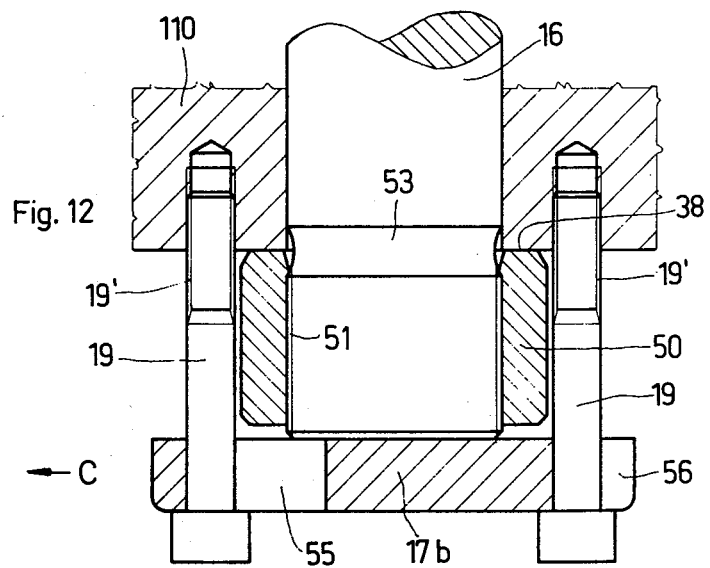
FIG. 12 shows the tie rod connection of FIG. 11 in a cross section along line XII—XII thereof.

A further improved version of a clamping flange of the type just described is illustrated in FIGS. 11 and 12. There, the clamping flange 17b has diametrically aligned slots 55 and 56 for its two clamping bolts 19, as a result of which the clamping flange 17b can be shifted in the direction of arrow C, after its bolts 19 have been loosened, which brings the flange out of reach of one of the clamping bolts 19, for a rotation around the other clamping bolts. The threaded portions 19' of both clamping bolts 19 can thus remain engaged in the plate 110 or 130, respectively.

Figure 13:
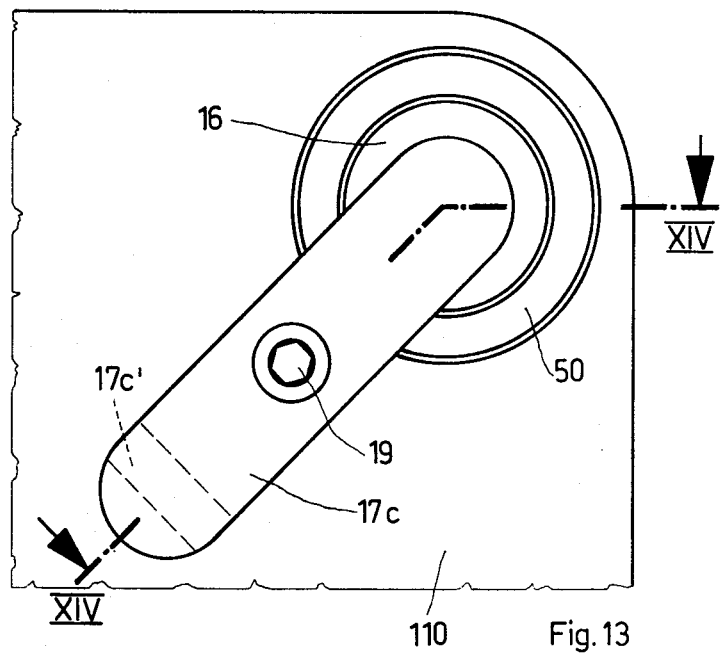
FIG. 13 is an end view of a further embodiment of the invention, featuring a tie rod connection with a clamping bracket.
Figure 14:
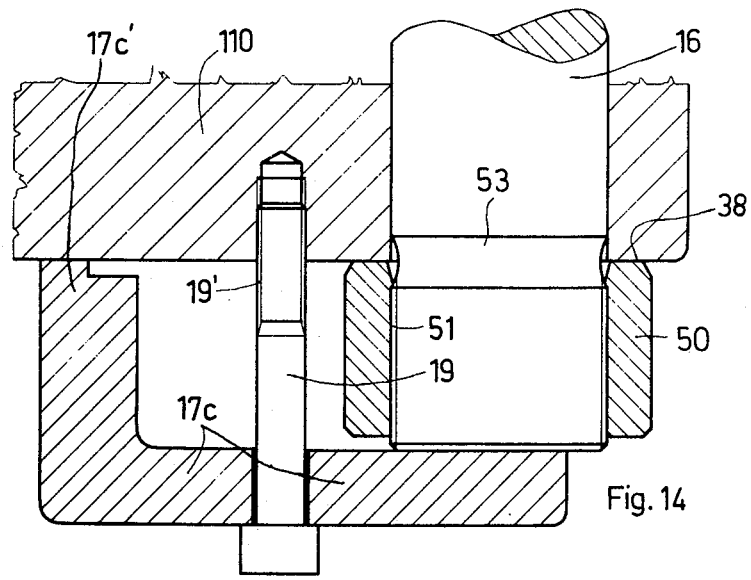
FIG. 14 shows the tie rod connection of FIG. 13 in a cross section along line XIV—XIV thereof.

In still another embodiment of the invention, which is shown in FIGS. 13 and 14, the clamping member is a simple clamping bracket 17c, a single clamping bolt 19 providing the clamping action. This clamping bracket 17c has an angle shape, a leg portion 17c' of the bracket 17c forming a support against the stationary plate 110, at a distance from the tie rod axis. The clamping bolt 19 is positioned approximately half-way therebetween. This clamping bracket 17c can be readily swivelled out of the way of the tie rod, following release of the clamping tension on the clamping bolt 19. It should be understood, on the other hand, that the leg portion 17c' of the clamping bracket 17c may be replaced by any other spacer member, which may be attached either to the clamping bracket 17c or to the stationary plate 110.

The present invention, while suggesting a novel tie rod connection of simplified structure, offers a convenient axially adjustability on at least one tie rod end portion, coupled with a clamping structure which greatly simplifies the steps which are required for the retraction of a tie rod. The retractability of one or several tie rods, in turn, makes it possible to mount large die halves on the die carrier plates, as is exemplified by the outline of the movable die half 11 in FIG. 2.

It should be understood, of course, that the foregoing disclosure describes only preferred embodiments of the invention and that it is intended to cover all changes and modifications of these examples of the invention which fall within the scope of the appended claims.

I claim the following:

1. In a die closing unit for an injection molding machine comprising, as part of said unit, a stationary die carrier plate and a movable die carrier plate to which are attachable stationary and movable die plates which form an injection molding die, said die carrier plates being arranged transversely to a longitudinal axis along which the movable die carrier plate is displaceable in a die opening and closing movement, while being guided and supported by at least two parallel longitudinal tie rods, said tie rods extending between the two die carrier plates and having at least one tie rod end portion connected to one of the die carrier plates in a tie rod connection which includes an attachable bore in the die carrier plate through which the connected tie rod end portion protrudes to the other side of the plate, where said end portion is threaded and engaged by a likewise threaded abutment collar, while a clamping member bears against the extremity of the protruding tie rod end portion, under the action of at least one clamping bolt, thereby axially preloading the tie rod connection by pressing its abutment collar against the die carrier plate, the improvement therein relating to said tie rod connection and comprising:

a seating engagement between said tie rod end portion and the attachment bore of the connected die carrier plate, the seated part of the tie rod end portion being as large in diameter as the tie rod portion which extends between the die carrier plates; and means defined by said clamping member and clamping bolt for swivelling the clamping member about the clamping bolt, following minimal unscrewing of the clamping bolt, for elimination of its clamping action.

2. An improved tie rod connection as defined in claim 1, wherein the clamping member is a plate-like clamping flange extending transversely across the extremity of the tie rod and bearing against an end face of the latter;

the clamping flange cooperates with at least two clamping bolts which are arranged on opposite sides of the tie rod, engaging threaded bores in the connected die carrier plate; and at least one clamping bolt has a retaining clip arranged on its shaft, in the space between the clamping flange and the die carrier plate, thereby preventing removal of the bolt from the flange, after unscrewing from its threaded bore.

3. An improved tie rod connection as defined in claim 1, wherein the clamping member is a plate-like clamping flange extending transversely across the extremity of the tie rod and bearing against an end face of the latter;

the clamping flange cooperates with two clamping bolts which are arranged diametrically opposite one another in relation to the tie rod extremity, engaging threaded bores in the connected die carrier plate; and said clamping flange swivelling means includes two openings in the clamping flange for the two clamping bolts, a first opening being a peripherally open slot allowing for the disengagement of the clamping flange from the associated first clamping bolt in a transverse movement, following minimal unscrewing of both bolts.

4. An improved tie rod connection as defined in claim 3, wherein the peripherally open slot in the clamping flange opens substantially radially outwardly, away from the tie rod extremity; and the second opening in the clamping flange, for the associated second clamping bolt, is in the form of a closed slot extending substantially radially inwardly from the clamping bolt towards the tie rod extremity, over a distance sufficient to allow for said transverse disengaging movement of the clamping flange.

5. An improved tie rod connection as defined in claim 1, wherein the clamping member is an elongated clamping bracket extending transversely to the tie rod, having one extremity bearing against the tie rod extremity and the other extremity supported against the connected die carrier plate, at a distance from the tie rod extremity; and the clamping bolt engages the clamping bracket at a point intermediate the two bracket extremities.

6. An improved tie rod connection as defined in claim 5, wherein the clamping bracket extremity which is supported against the plate is part of an angled-off leg portion of the bracket whose length is substantially the same as the length over which the tie rod end portion protrudes from the die carrier plate.

7. An improved tie rod connection as defined in claim 1, wherein each tie rod includes, in its connected end portion, a central axially oriented threaded bore for the attachment of a matching threaded traction rod which serves to retract the tie rod through the attachment bore of the die carrier plate.

* * * * *